United States Patent
Planegger et al.

(10) Patent No.: US 10,070,756 B2
(45) Date of Patent: Sep. 11, 2018

(54) KITCHEN APPLIANCES WITH SPEED CONTROL

(71) Applicant: KONINKLIJKE PHILIPS N.V., Eindhoven (NL)

(72) Inventors: Walter Alex Planegger, Eindhoven (NL); Mario Hosner, Eindhoven (NL); Joze Dermol, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/028,956

(22) PCT Filed: Nov. 25, 2014

(86) PCT No.: PCT/EP2014/075512
§ 371 (c)(1),
(2) Date: Apr. 13, 2016

(87) PCT Pub. No.: WO2015/078853
PCT Pub. Date: Jun. 4, 2015

(65) Prior Publication Data
US 2016/0256009 A1    Sep. 8, 2016

(30) Foreign Application Priority Data

Nov. 27, 2013  (EP) .................................. 13194703

(51) Int. Cl.
*B23Q 15/00*   (2006.01)
*A47J 43/08*   (2006.01)
*A47J 43/044*  (2006.01)

(52) U.S. Cl.
CPC .... *A47J 43/082* (2013.01); *A47J 2043/04427* (2013.01)

(58) Field of Classification Search
CPC .. A47J 42/08; A47J 42/18; A47J 42/38; A47J 42/46; A47J 43/04; A47J 43/08;
(Continued)

(56) References Cited

U.S. PATENT DOCUMENTS 2,907,226 A * 10/1959 Gasparotti ............ A47J 43/082
                                                  173/179
3,548,280 A    12/1970 Cockroft
3,772,490 A * 11/1973 Thordarson ............ H01H 13/14
                                                  200/286
(Continued)

FOREIGN PATENT DOCUMENTS

AU    2007216770 A1    4/2008
CA     965776 A1       4/1975
(Continued)

OTHER PUBLICATIONS

Honeywell, Micro Switch Premium Subminiature Basic Switches—SM Series, pp. 2, 6, and 7. Accessed Dec. 6, 2016.*

*Primary Examiner* — Dana Ross
*Assistant Examiner* — Brandon Harvey (57) ABSTRACT

A kitchen appliance has a power switch for controlling supply of power to a motor and a separate control circuit (18) for controlling the speed. A button (14) for control by the user is provided for controlling both the actuation and speed. A carrier (40) carries the button, and also carries a first actuator (44, 86) for mechanically actuating the power switch when the button is first moved. When the button is further moved, the motor speed is controlled.

17 Claims, 4 Drawing Sheets (58) Field of Classification Search
CPC .................... A47J 43/082; A47J 43/085; A47J 2043/04409; A47J 2043/04427
USPC .................................................. 99/486, 510
See application file for complete search history.

(56) References Cited

U.S. PATENT DOCUMENTS

| | | |
|---|---|---|
| 6,599,006 B1 | 7/2003 | Lin |
| 6,717,080 B1 | 4/2004 | Chan |
| 6,794,594 B2 | 9/2004 | Ching |
| 2002/0176320 A1 | 11/2002 | Wulf |
| 2003/0141765 A1 | 7/2003 | Chu |
| 2005/0122836 A1 | 6/2005 | Boyle |
| 2006/0203610 A1 | 9/2006 | Bahannon, Jr. |
| 2008/0041880 A1 | 2/2008 | Babineau |
| 2009/0097351 A1 * | 4/2009 | Li .................... A47J 43/0705 366/129 |
| 2010/0066220 A1 | 3/2010 | Grimm |
| 2010/0143558 A1 * | 6/2010 | Aharonovitch .......... A23N 1/00 426/489 |

FOREIGN PATENT DOCUMENTS

| | | |
|---|---|---|
| CN | 1287369 A | 3/2001 |
| EP | 2130469 A1 | 12/2009 |
| FR | 2754156 A1 | 4/1998 |
| FR | 2754166 A1 | 4/1998 |
| GB | 2314980 A | 1/1998 |
| GB | 2314980 B | 1/1998 |
| KR | 201102028 U | 3/2011 |
| WO | 2011113082 A1 | 9/2011 |
| WO | WO 2013020571 A1 * | 2/2013 ............ A47J 43/044 |

* cited by examiner

KITCHEN APPLIANCES WITH SPEED CONTROL

This application is the U.S. National Phase application under 35 U.S.C. of § 371 of International Application No. PCT/EP2014/075512, filed on Nov. 25, 2014, which claims the benefit of International Application No. 13194703.8 filed on Nov. 27, 2013. These applications are hereby incorporated by reference herein.

FIELD OF THE INVENTION

This invention relates to kitchen appliances having a speed adjustment function. One example is bar blenders.

BACKGROUND OF THE INVENTION

According to regulations it is required to separate power supply circuits and control circuits in kitchen devices. For this reason, current kitchen appliances such as bar blenders have a user interface which provides galvanic separation of power control and speed adjustment. Thus, bar blenders typically have an on-off control switch, and a separate speed control input. There are various ways to implement the user interface to provide an easy to use device.

A first known approach is to provide a speed pre-selection switch and a separate push type on/off switch, which needs to be held on. The speed is pre-selected before the rotation of the tool is activated by pressing the on/off-switch. Some devices comprise an additional turbo switch to boost the speed.

A second known approach is to provide an on/off switch in the form of a switch which can be locked into its on and off positions, and a separate speed regulation switch. The speed regulation switch can be pressure sensitive or it can move along a pathway which is related to speed.

It would be more convenient to provide a combined on/off and speed regulation switch, to give a one-switch solution. This would enable user operation with only one user interface. However, this is inconsistent with the requirement for separate circuits. Furthermore, the amount of movement of the input switch for a hand held device such as a bar blender is limited since the whole device is gripped in the palm of the hand. A compact switch arrangement is therefore needed. In particular, a push switch should have a short path of movement, since long movement paths are associated by customers with low quality, and they also hamper accurate operation of the device.

SUMMARY OF THE INVENTION

The invention is defined by the claims.

According to an aspect of the invention, there is provided a kitchen appliance, comprising a push button arrangement and a motor, wherein the push button arrangement is for controlling the on-off actuation of the motor as well as a speed of the motor, and comprises:
a power switch;
a speed control circuit, separate to the power switch;
a button for movement by a user;
a carrier which carries the button, a first actuator and a second actuator,
wherein the first actuator is for mechanically actuating the power switch when the button is first moved, and
the second actuator is for controlling the speed control circuit for controlling the motor speed when the button is further moved.

The invention thus provides a kitchen appliance which combines a power on-off function and a speed control function into a single movable button. A separate speed control circuit and power switch is provided, but they are both operated by respective actuators carried by the same carrier, which is moved by the button. The button can for example be pressed by the user of the appliance, although the button can be arranged to have a sliding or pivoting movement.

The speed control circuit can comprise a travel sensing circuit, and the second actuator comprises a travel element for controlling the travel sensing circuit. The travel sensing circuit can have a resistance, capacitance or inductance which is a function of the amount of travel, and the level of this resistance, capacitance or inductance is then used to control the speed. In a simplest implementation, the travel sensing circuit comprises a set of discrete resistors, or a potentiometer circuit, and the second actuator then comprises a contact element for creating an electrical circuit with a desired resistor or set of resistors, or a desired potentiometer setting.

The first actuator can comprise a spring-loaded pin carried by the carrier, beneath the button, for mechanically engaging with the power switch when the button is first moved. The spring loading enables the pin to retract after it has engaged the power switch, but maintaining the power switch actuation.

The power switch can comprise a micro switch with a push contact which is pushed by the first actuator to close the switch. This provides a compact arrangement. Furthermore, the reliability of the switch contact is achieved by suitable selection of micro switch.

In another embodiment, the power switch can comprise a pair of electrical contacts which are shorted by the first actuator when the button is first moved. This provides an even simpler arrangement of the power switch.

In another embodiment, the power switch can comprise a pair of electrical contacts which are shorted by a shorting member, wherein the shorting member is biased into a non-shorting position, and the shorting member is moved into contact with the pair of electrical contacts when the button is first moved, wherein the shorting member is biased into a non-shorting position and is moved into the shorting position by movement of the carrier. This arrangement also provides simple shorting of contacts.

A return spring is preferably provided for biasing the carrier to an initial button position. This is arranged to return the button to a position in which the power switch is open, and the first actuator is released from the power switch. The return spring can comprise a coil spring, although other biasing arrangements can be used.

The speed control circuit can additionally be controlled to provide a step increase in speed when the button is moved into its final position. This function is often called a turbo or boost function, and it provides a maximum speed setting, a step higher than the maximum speed at the end of the range of variable speed control.

The appliance can further comprise a tactile, audible or visual feedback system for providing feedback during button movement. This gives the user greater control of the speed.

Preferably, the power switch is mechanically actuated within 3 mm of movement of the button from an initial button position, and more preferably within 2 mm of movement of the button from the initial position. This provides a short movement distance before the speed adjustment function is enabled.

The movement of the button can be limited to at most 20 mm, more preferably at most 10 mm. This means the full control is achieved within a short range of movement, which is found to provide an interface which is easiest and most comfortable for the user.

The appliance can comprise one of:
a bar blender;
a mixer;
a chopper;
a food processor;
a grinder; and
a juicer.

Some of these may be hand held devices and others may be table top mounted. In all cases, a power on-off function is needed as well as a speed control, and the invention provides a single control button for implementing both functions.

The invention is for example of particular interest for bar blenders, which comprise a main housing having a handle grip portion and a motor within the housing for driving a blender blade. The power switch is for controlling the supply of power to the motor, and the button is located at the handle grip portion.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a kitchen appliance having a power switch for controlling supply of power to a motor and a separate control circuit for controlling the speed. A button for control by the user is provided for controlling the actuation and speed. A carrier carries the button, and also carries a first actuator for mechanically actuating the power switch when the button is first moved. When the button is further moved, the motor speed is controlled.

This provides a one-button solution, combining the power on/off function and the speed adjustment in one switch, and which can be designed with a minimum length of travel of the button.

Detailed examples will now be described, which show the invention applied to a bar blender having a push button control input. The same switch design can however be applied to other kitchen appliances and with other configurations of dual function button.

Figure 1:
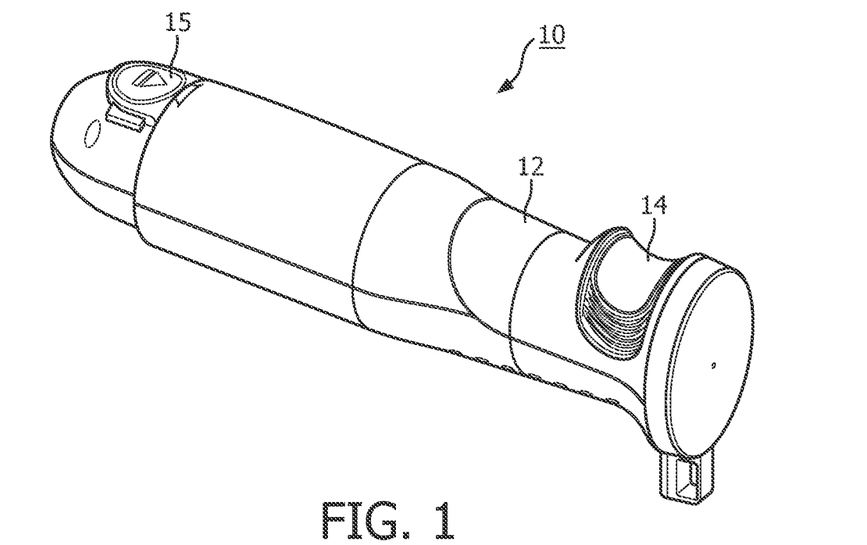
FIG. 1 shows a bar blender of the invention in perspective view.

FIG. 1 shows a first example of bar blender using the switch arrangement of the invention, in perspective view.

The blender comprises a main housing 10 having a handle grip portion 12. A user control switch is at the handle grip portion for controlling the motor actuation and speed. In this example, the user control switch comprises a push button 14, positioned at the location of the user's index finger when gripping the handle. A release button 15 enables fitted attachments such as a blending tool or whisking tool to be swapped over.

Figure 2:
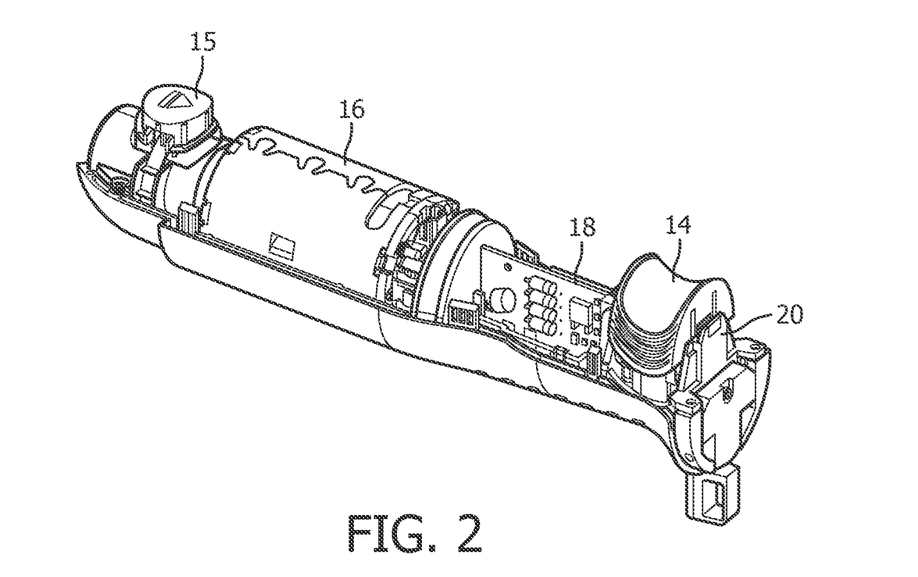
FIG. 2 shows the bar blender of FIG. 1 with the top cover removed to show the arrangement of internal components.

FIG. 2 shows the bar blender with a top cover removed to show the arrangement of internal components. The blender has a motor 16 within the main housing for driving a blender blade or other attachments.

Within the handle grip part, there is a control circuit for the blender, including circuitry mounted on a Printed Circuit Board (PCB) 18 for controlling the motor speed.

In this example shown, this circuitry includes a resistor circuit for providing an adjustable motor drive. This resistor circuit can comprise a chain of resistors connected in series, which results in a step type control. To implement the motor drive control, a slider is in contact with the resistors, and the movement of the slider results in selection of one of the resistors. This provides a discrete control approach. A directly analogous alternative is to use an analogue potentiometer.

The push button 14 is mounted within a housing 20 which enables the push button 14 to slide relative to the housing. For this purpose, the push button 14 is carried by a carrier (although it should be understood that the carrier and push button can be a single integrated component). The push button 14 and its carrier form part of what is termed in this document a "push button arrangement". The push button can be considered to be the external feature which the user presses, and the carrier is the structure beneath.

Figure 3:
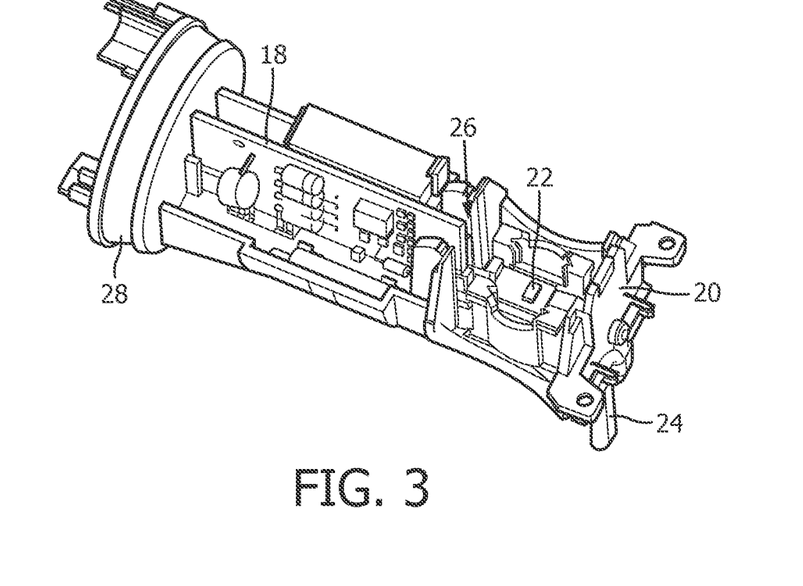
FIG. 3 shows in more detail the housing which carries the push button.

FIG. 3 shows in more detail the housing 20 which carries the push button arrangement (and shows the push button removed). The housing forms a cradle for the push button and its carrier. At the base of the housing 20 is a micro switch 22 functioning as a power switch. This is a switch which is actuated by very little physical force, typically through the use of a tipping point mechanism (otherwise known as an "over-center" mechanism). Switching takes place at specific and repeatable positions of the actuator and with a small amount of movement required between the different switch positions.

The mains input cable 24 is electrically connected to the rest of the device through the power switch 22, so that the power switch 22 controls the supply of power to the remainder of the device, and thus functions (at least) as the power supply control for the motor.

The mains cable 24 is to one side of the housing 20 (at the top end of the main housing), and the other side of the housing has a slot 26. The push button arrangement includes an electrical contact which slides up and down the slot 26 when the push button is moved. This electrical contact interfaces with electrical contact tracks on the PCB 18, which connect to the discrete resistors mentioned above. For this purpose, an edge of the PCB 18 is aligned with the slot 26 as shown. The motor is not shown in FIG. 3, but a motor support which fixes to the motor is shown as 28.

Figure 4:
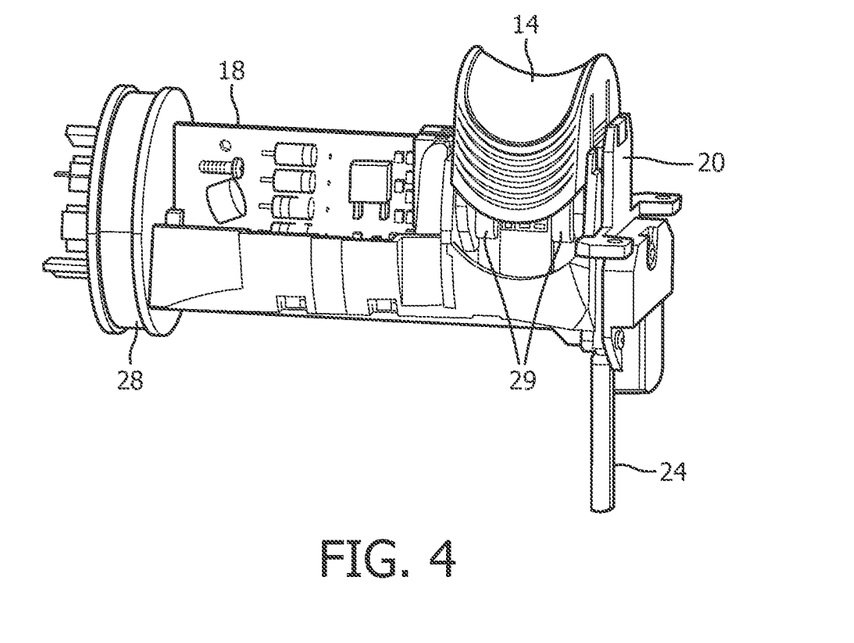
FIG. 4 shows in more detail the push button mounted in its housing.

FIG. 4 shows in more detail the push button arrangement mounted in its housing 20. The push button arrangement has retaining hooks 29 which clip the push button arrangement into the housing 20 thereby limiting the upward movement of the button. The downward movement is limited by a mechanical stop arrangement, which is engaged when the push button is fully depressed.

Figure 5:
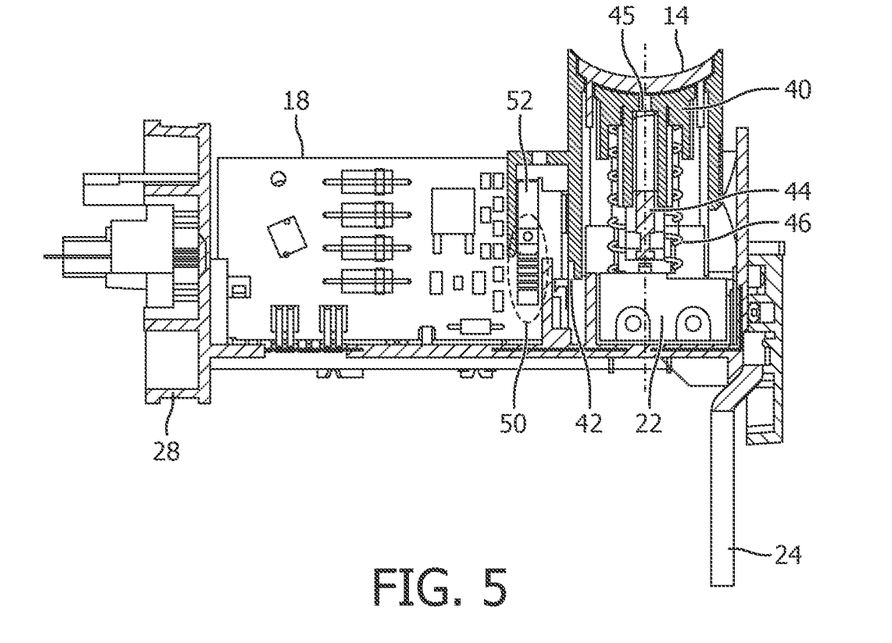
FIG. 5 shows a cross sectional view of the push button and its housing and shows the on/off function more clearly.

FIG. 5 shows a cross sectional view of the push button arrangement and its housing and shows the on/off function more clearly.

The push button 14 and its slidable carrier 40 can be seen more clearly. A base 42 of the carrier together with a corresponding part of the housing 20 define the mechanical stop mentioned above which limits the pressing-in of the button 14.

At the base of the housing is located the micro switch (power switch) 22. A spring loaded pin 44 is carried by the slidable carrier 40, beneath the button 14, for mechanically engaging with the power switch when the button is first depressed. This spring loaded pin functions as a first actuator for mechanically actuating the power switch when the button is first depressed.

The spring 45 of the spring loaded pin is located centrally inside the pin (which is hollow for this purpose) and biases the pin towards the power switch. The spring force is sufficient to activate the switch.

The carrier 40 is biased into the non-depressed position by a return spring 46. In the example shown, this is arranged concentrically outside the spring 45 of the pin 44, to provide a compact arrangement.

The spring loaded pin 44 is biased outwardly by the spring 45 and reaches a stop which means that it is just above the power switch when the carrier 40 is in the non-depressed position. There is a clearance of around 1 mm as explained below. The pin 44 can retract and a sliding sleeve arrangement enables this.

FIG. 5 also shows more clearly the resistor circuit PCB contacts 50 and the contact element 52 carried by the carrier 40. There can be two contact elements 52 if a double sided PCB is used, one for each side of the PCB, but only one can be seen in FIG. 5. The edge of the PCB 18 sits in the space between the two contacts 52. The relative position of the contacts 52 along the PCB edge determines which PCB tracks are electrically connected, which then determines the setting of the speed control circuit.

Figure 6:
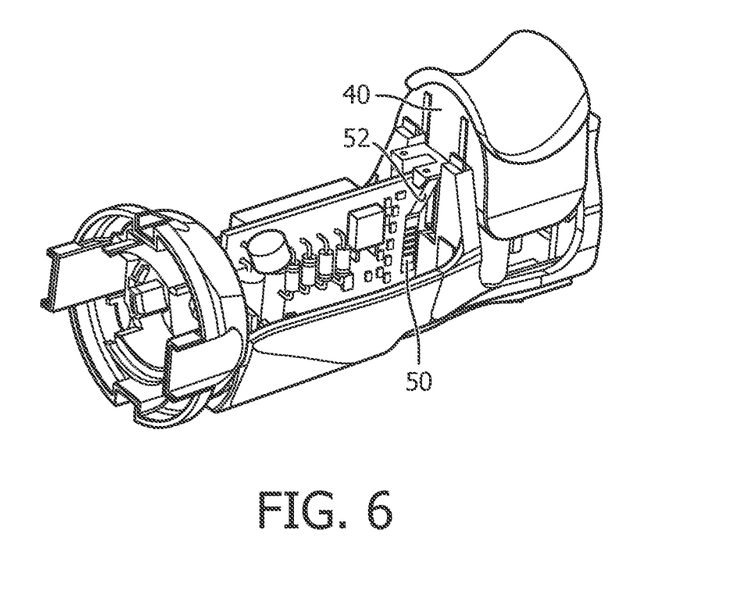
FIG. 6 shows the speed control function of the push button more clearly.

FIG. 6 shows the speed control function of the push button more clearly. The PCB 18 has resistor tracks 50, and sliding contacts 52 are mounted to move with the carrier 40 and engage with the PCB tracks. The sliding contacts (of which there may be one or more) control the coupling of resistors. In this way, a circuit resistance is controlled in dependence on the push button position. This is then used in a motor control circuit, for example a transistor circuit with variable load depending on the resistor setting. The sliding contacts function as a second actuator for controlling the motor speed when the button is further depressed.

This design makes use of a micro switch for the power on/off function. Speed setting resistors are connected by lead tracks on the PCB. This arrangement enables a minimum push button path length. The micro switch power switch is activated first, and the speed is regulated according to the subsequent path of the push button. For example, after the power switch is activated, at first the device will not rotate. After a travelling distance of 2 mm for example, the device starts rotating with speed setting 1. For an additional travelling distance of for example 1 mm, the speed remains at speed 1. After a total travelling distance of 3 mm the slider 52 then switches to the next resistor and the speed is set to speed setting 2. The progressive movement of the carrier thus causes the speed control circuit to steps through the speed settings.

The resistor tracks can be designed to provide a speed according to an arithmetic function in relation to the depression of the push button. The function could be linear, exponential, cascading or any other suitable function. Although not shown, the blender can further include a separate turbo boost switch. Alternatively, a turbo boost function can be implemented by the single switch, for example at the maximum movement (maximum depression) of the push button position. The turbo boost function can provide a step increase in speed when the button is fully moved (fully depressed). Thus, the speed control enables selection of a speed from a set of speeds in a first range, or selection of a speed which is larger than the highest speed in the first range, and also a larger increase in speed compared to the difference in speed between any adjacent speeds in the first range.

When the user presses the push button, the switch slides along a predefined path of approximately 1 mm until the spring loaded pin contacts the micro-switch. This initial 1 mm clearance provides a safety measure to ensure that the return spring does indeed disengage the power switch.

The pin is preloaded with a spring-force to be able to immediately activate the micro-switch, which has a switching path of approximately 1 mm. For example, the spring force of the spring loaded pin can be higher than the spring force of the return spring.

In this way, it can be ensured that the total path is approximately 2 mm which is a desirable value based on bar-blender consumer application tests. Preferably, this path length is less than 3 mm, and it may be 2 mm or less.

Once the power switch is activated, the motor and its attached tool begin to rotate slowly. In one example, the user can further move the push button along its pathway for up to 8 mm to adjust the required speed. During this movement, the pin depresses 44 into the carrier 40 against the spring 45. After 8 mm, the carrier meets mechanical stops. If a turbo boost function is provided, it can be enabled only when the button is in this mechanically stopped fully depressed position. When the user releases the button, the switch is returned to the starting position and is disconnected from the power source by deactivation of the micro-switch. Thus, the total path length can in this example be kept to 10 mm or less. It is generally preferred that this path length is less than 20 mm.

The example above makes use of a micro switch for the power switch.

Figure 7:
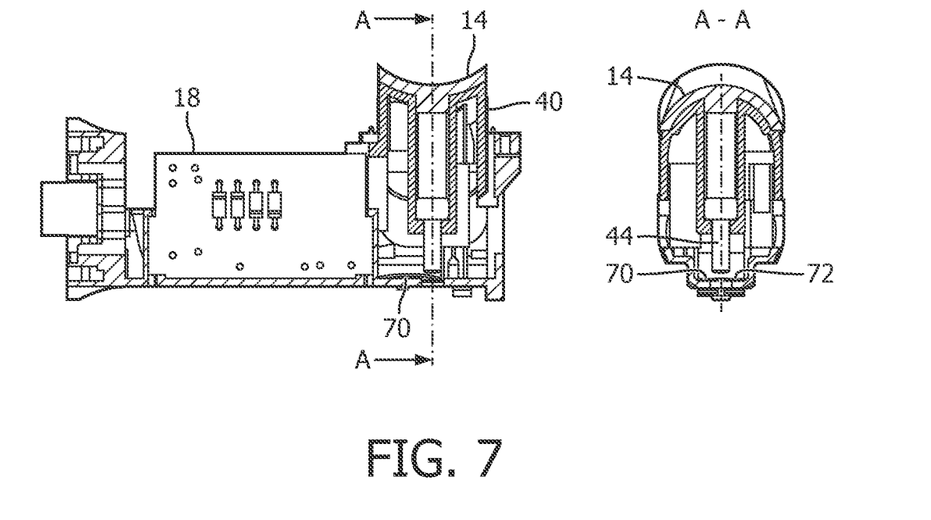
FIG. 7 shows a first alternative implementation of the power switch.

FIG. 7 shows a first alternative implementation of the power switch, and shows cross sections taken at two perpendicular angles. The same reference numbers are used as in the first example for the same components. The switch again has a spring loaded pin 44 (the spring is not shown in FIG. 7), but in this arrangement, the pin is for providing a short by directly contacting two spaced apart contact electrodes 70, 72 at the base of the housing. This can provide an even more compact arrangement with fewer components. The spring force of the spring loaded pin is designed to ensure that reliable electrical contact is maintained.

Figure 8:
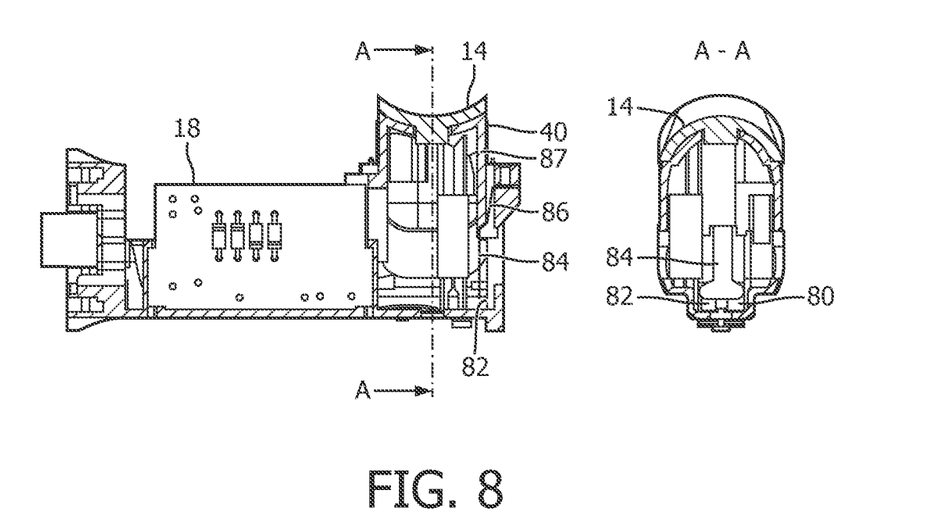
FIG. 8 shows a second alternative implementation of the power switch.

FIG. 8 shows a second alternative implementation of the power switch.

A pair of electrical contacts 80, 82 is provided laterally near the base of the housing. A shorting member 84 is mounted within the housing for shorting the contacts. The shorting member 84 is biased into a non-shorting position (as shown in FIG. 8) by a spring steel configuration 86, and the shorting member is moved into contact with the pair of electrical contacts when the button is first depressed.

The shorting member 84 is pushed against the contacts 80, 82 by a wedge 87, which engages with a face of the shorting member 84 when the button is depressed. The wedge 87 is part of the movable carrier 40 so moves down when the carrier is depressed. The spring bias of the shorting member 84 ensures that the electrical contact is broken when the button is released.

The example above makes use of a coil spring as the return spring. However, other springs may be used, such as a leaf spring.

In the example above, the speed control is by moving a contact with respect to a resistor track arrangement. However, the speed control may be an actuator which engages with a speed control lever of a speed control circuit, rather than acting as the actual electrical contact. Thus, instead of the moving contact and the PCB together forming a variable resistor circuit, there may be a discrete speed control circuit on the PCB (such as a potentiometer circuit) which is then mechanically operated by movement of the button. Other speed control modules may also be used instead of a resistor or potentiometer circuit. More generally, any travel sensing circuit can be used, which is then controlled by a travel element. The travel sensing circuit can for example be based on resistive, inductive or capacitive travel sensing. Further alternative travel sensing approaches include optical sensing or magnetic field sensing arrangements, in which movement results in a change of optical illumination or magnetic field.

In the detailed examples above, the button and its carrier slide in and out of the housing, and the button is depressed by the user pushing the button. The bottom may instead pivot and still give essentially the same user experience. A further alternative is for the button to slide horizontally (i.e. parallel with the surface of the outer housing) instead of vertically into and out of the housing volume. Thus, while the example above discussed the pushing of the button from an initial non-depressed position into a fully depressed position, the invention relates more generally to button which are moved between an initial and final position in any suitable manner.

It may be desirable to provide tactile, audible or optical feedback to the user, for example by providing a clicking sensation by vibrating the push button, or by providing a clicking sound or providing an indication at a display or with a light. This gives the user a sensation of greater control. Each click may correspond to a different potentiometer setting and therefore speed setting.

The sound and tactile feedback can be achieved by providing a spring loaded metal contact which slides against a set of teeth when the push button is moved. The variation in force needed provides tactile feedback and also a sound can be in this way if desired. Other ways of providing feedback can be used.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A kitchen appliance, comprising a button arrangement and a motor, wherein the button arrangement is for controlling an on-off actuation of the motor as well as a speed of the motor, and comprises:
   a power switch;
   a speed control circuit, separate to the power switch;
   a button for movement by a user; and
   a slidable carrier including a housing an outer wall, wherein the slidable carrier carries the button and a second actuator,
   wherein the slidable carrier also carries and the outer wall at least partially surrounds a first actuator which is configured to mechanically actuate the power switch when the button is first moved, and
   the outer wall at least partially surrounds the second actuator which is configured to control the speed control circuit to control the motor speed when the button is further moved.

2. The appliance as claimed in claim 1, wherein the speed control circuit comprises a travel sensing circuit, and the second actuator comprises a travel element configured to control the travel sensing circuit.

3. The appliance as claimed in claim 1, wherein the first actuator comprises a spring-loaded pin carried by the slidable carrier, wherein the pin is configured to mechanically engage the power switch when the button is first moved.

4. The appliance as claimed in claim 1, wherein the power switch comprises a micro switch with a push contact which is pushed by the first actuator to close the switch.

5. The appliance as claimed in claim 1, wherein the power switch comprises a pair of electrical contacts which are shorted by the first actuator when the button is first moved.

6. The appliance as claimed in claim 1, wherein the power switch comprises a pair of electrical contacts which are shorted by a shorting member when the button is first moved, wherein the shorting member is biased into a non-shorting position and is moved into the shorting position by movement of the slidable carrier.

7. The appliance as claimed in claim 1, further comprising a return spring for biasing the slidable carrier to an initial button position.

8. The appliance as claimed in claim 7, wherein the return spring comprises a coil spring.

9. The appliance as claimed in claim 1, wherein the speed control circuit is configured to provide a step increase in speed that is a larger increase in speed as compared to an increase in speed between a prior step increase in speed when the button is further moved to a final position.

10. The appliance as claimed in claim 1, further comprising a tactile, audible or optical feedback system for providing tactile, audible or optical feedback during button movement.

11. The appliance as claimed in claim 1, wherein the power switch is mechanically actuated within 3 mm of movement of the button from an initial button position.

12. The appliance as claimed in claim 1, wherein the movement of the button is limited to at most 20 mm.

13. The appliance as claimed in claim 1, wherein the button is moved by pushing, thereby to depress the button.

14. The appliance as claimed in claim 1, comprising one of:
   a bar blender;
   a mixer;
   a chopper;
   a food processor;
   a grinder; and
   a juicer.

15. The appliance as claimed in claim 14, comprising the bar blender, wherein the bar blender comprises a main housing having a handle grip portion, wherein the motor is within the housing for driving a blender blade, and the button is located at the handle grip portion.

16. The appliance as claimed in claim 1, wherein the power switch is mechanically actuated within 2 mm of movement of the button from an initial button position.

17. The appliance as claimed in claim 1, wherein the movement of the button is limited to at most 10 mm.

* * * * *